United States Patent [19]
Tiley

[11] 3,719,252
[45] March 6, 1973

[54] TREE SEAT

[76] Inventor: Garen R. Tiley, 8012 Crystal Valley Cove, Little Rock, Ark. 72204

[22] Filed: Dec. 20, 1971

[21] Appl. No.: 209,991

[52] U.S. Cl. ................................................ 182/187
[51] Int. Cl. ................................................ A47c 9/10
[58] Field of Search ................ 182/187, 92; 248/216

[56] References Cited

UNITED STATES PATENTS

| | | | |
|---|---|---|---|
| 857,203 | 6/1907 | Randall | 182/187 |
| 1,090,836 | 3/1914 | Brush | 248/216 |
| 2,394,203 | 2/1946 | Pruder | 182/187 |
| 3,261,425 | 7/1966 | Harder | 182/187 |
| 3,298,459 | 1/1967 | Bergsten | 182/92 |

Primary Examiner—Reinaldo P. Machado
Attorney—Harvey B. Jacobson et al.

[57] ABSTRACT

A readily attachable and detachable portable type tree seat of requisite size and shape for convenient use by a hunter. It has an inward cantle-like body portion and a pommel-like forward or outward end portion, resembles a bicycle seat or saddle in top plan, and provides a comfortably resilient seat for the occupant. A centrally balanced supporting rod is fixed on the seat and has a screw-threaded shank or stud which can be expeditiously embedded and temporarily screwed and securely anchored on the tree for convenient reliable use in the special environment at hand. A V-shaped prop has pointed anchoring ends and a U-shaped vertex portion which is hingedly mounted on an adapter lug carried by the non-twisting portion of the embedded rod.

9 Claims, 3 Drawing Figures

PATENTED MAR 6 1973  3,719,252
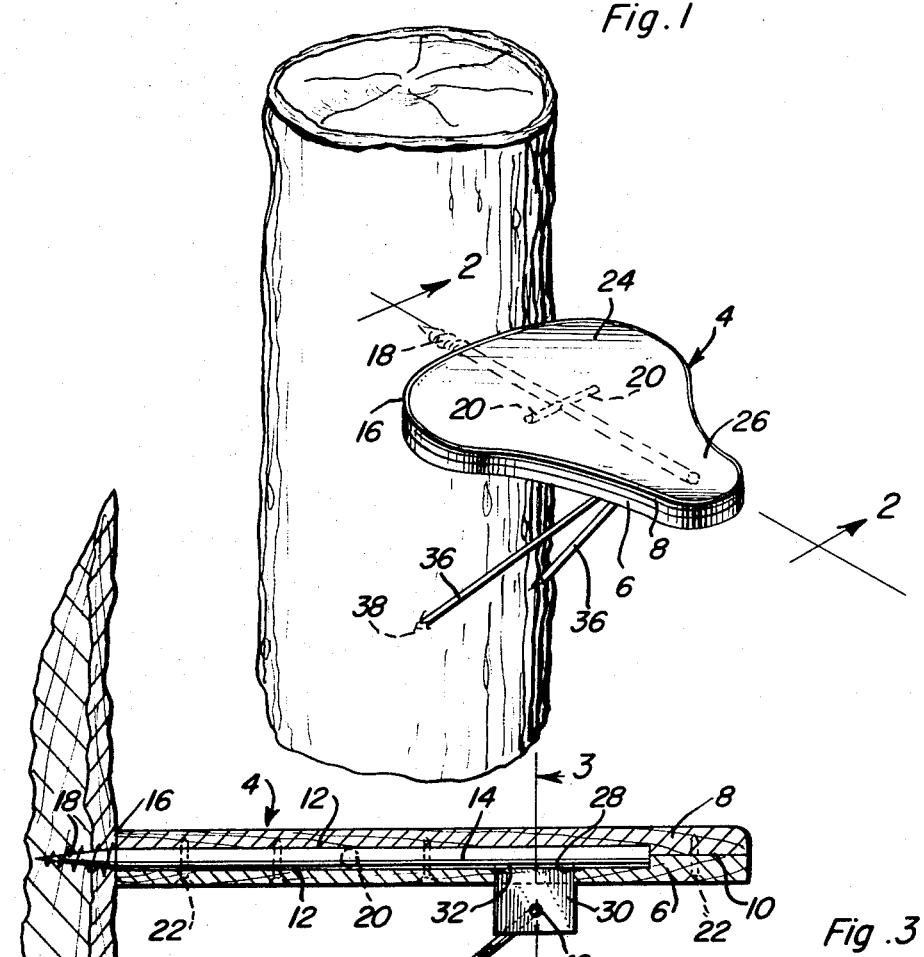
Fig. 1
Fig. 2
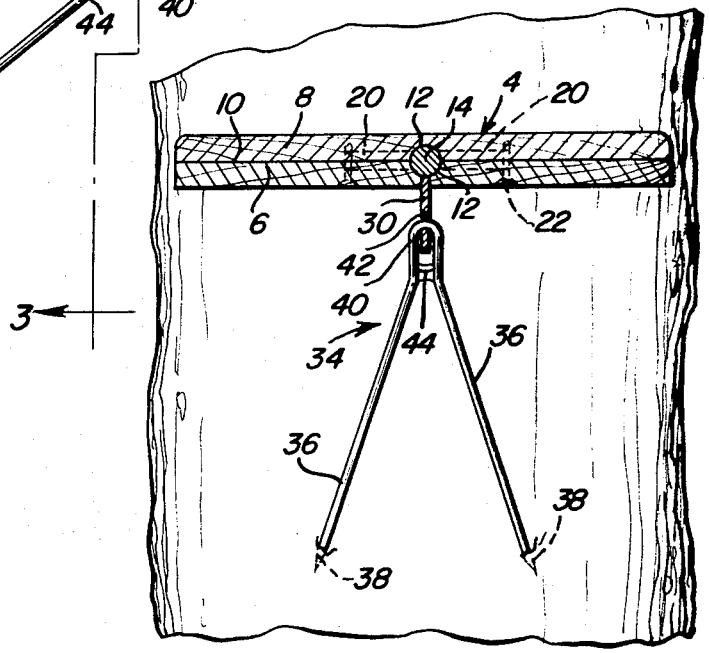
Fig. 3

TREE SEAT

The present invention relates to a portable type readily applicable and removable tree seat which lends itself to satisfactory and reliable use on the trunk of a tree in the hunting environment at hand and has to do, more particularly, with a saddle-shaped seat having means by way of which it can be perched and mounted at the height desired on the selected tree.

An object of the invention, generally stated, is to advance the art of tree seats through the medium of a structurally simplified adaptation which is not only an advance in the art but, compared to prior art hunting seats, more satisfactorily serves the purposes for which it has been perfected and reliably and acceptably used.

Many and varied tree seats have been devised by others for use by hunters. For background purposes, reference may, if desired, be made to the portable seat for hunters revealed in U.S. Pat. No. 2,855,980 granted to Konieczka. This prior patent is used for the same purpose but has to do with a comparatively complicated structural adaptation which apparently, and, for one reason or another, has not met with widespread adoption and use. Although for a different purpose but because it is analogous to the subject matter under consideration, reference can be made to the Ferdinand Miller tree scaffold, that is, U.S. Pat. No. 1,206,574.

In carrying out the principles of the present invention, the construction utilized is relatively light, portable, small in size and can be easily carried by the user while walking to his destination in a contemplated hunting area. The saddle-like configuration herein employed has been found to be safe, comfortable and reliable while in operation, even when perched and anchored at an elevated locale such as may be deemed to be desirable under certain look-out conditions. Then, too, the present invention, despite its utmost simplicity in construction is nevertheless sturdy and safe. Furthermore, and this is significantly important, the construction involves a choice and interrelationship of component parts which coordinate in preventing squeaking sounds and objectionable noises. Then, too, the seat is otherwise such in construction that its use on the tree will not injure or damage the tree.

Briefly, the novel seat is characterized by a rigid platform designed and adapted to occupy a horizontal position at right angles to the verticality of the trunk of the tree and which has an inward marginal edge portion capable of abutting a selected surface of the trunk. An elongated centralized and balanced rod is embedded with appropriateness in a lengthwise part of the platform and has a projecting screw-threaded portion which is capable of being turned and screwed and retentively anchored in a selected area on the tree trunk. A V-shaped prop embodies a pair of outwardly diverging legs having free diverging ends which are pointed and adapted to be removably but supportively anchored in the trunk. The converging ends are jointed by a U-shaped yoke or bight portion and means functions to join the inner end portions to an adapter, more particularly, a depending lug carried by the embedded rod.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective showing a fragmentary portion of a tree trunk and showing, what is more significant, the improved hunter's tree seat and precisely how it is contoured and attached and supported for use by the hunter;

FIG. 2 is an enlarged view with parts in section and elevation taken approximately on the plane of the central section line 2—2 of FIG. 1 looking in the direction of the indicating arrows; and FIG. 3 is a section taken on the irregular vertical section line 3—3 of FIG. 2.

The platform 4 can be constructed of appropriate durable but lightweight material which could be wood, lightweight metal such as aluminum, or appropriate moldable plastic material. The preferred construction is that which is shown and wherein top and bottom plies or laminations are aligned and bonded together in superimposed relationship, the bottom lamination being denoted at 6 and the top one at 8. The abutting surfaces are bonded together in face-to-face relationship and these surfaces (FIGS. 2 and 3) are denoted at 10 and have substantial portions provided with aligned semi-circular grooves 12 providing a bore for the associated or embedded rod, that is the rod 14. In actual practice this rod comprises a rigid lag screw whose left hand end portion in FIGS. 2 and 3 is projected beyond the inward marginal edge 16 to provide a tapered screw-threaded anchoring stud as at 18. The median portion of the rod is provided on opposite diametrically opposite sides with outstanding rigid coaxial fingers 20 which when embedded in the manner shown in dotted lines, serve to prevent twisting or turning of the rod once it is bound and secured in place. The laminations or plies can be further stabilized by flat headed screws or equivalent fasteners as suggested at 22 in FIGS. 2 and 3. While considering this composite platform it will be observed that in top plan it is contoured or delineated to provide a convenient saddle shape, that is, a shape which is comparable to the shape of a bicycle seat having a cantle-shaped body portion 24 and a reduced outer pommel or horn-shaped end portion 26.

It should be noted that the aforementioned coplanar fingers 20 branch out from diametrically opposite sides of the mid-portion of the rod and reduce the likelihood of the rod twisting or turning axially. The rod itself can be substantially commensurate in length with the overall length of the platform or seat. In addition, it will be seen in FIG. 2 in particular that the underneath side 28 is provided with adapter means, more particularly, a flange or lug 30 which is welded in place at 32 and which depends below the bottom side of the seat and is centrally apertured. This centrally apertured lug serves to provide for connection of the prop 34 with the seat. This prop is formed from a length of rod or stock which is bent upon itself intermediate its ends to provide a substantially V-shaped prop. The outwardly and downwardly disposed legs 36 have pointed terminal ends 38 which are embedded in the bark of the tree trunk. The intermediate portion of the prop is fashioned into a substantially U-shaped yoke which is denoted at 40, the curvate bight portion being pivotally mounted in the aperture provided therefor, as at 42 in FIG. 3. The limbs of this U-shaped yoke are rigidified by a cross-brace 44 joined with the converging ends of the legs 36.

It is submitted that the construction of the component parts is clearly brought out in the several views of the drawing and that the manner of support and use is likewise evident. It is again emphasized that the materials which are chosen and assembled have been so devised and used that when the seat is in operation it is virtually free from squeaking sounds and noises which would be objectionable while on a hunting expedition. In actual practice, it may be and preferably is desirable to provide wooden pegs (not shown) which can be brought in use to plug the holes which are left in the tree by the legs of the prop and the anchor point of the screw-threaded stud 18.

Not only is the seat virtually free of noises when being used, the component parts are such that it is virtually noiseless while being transported, this being important, of course, to a hunter.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For use by a hunter, a portable tree supported seat comprising a rigid platform designed and adapted to occupy a horizontal position at right angles to the trunk of said tree and having an inward marginal edge portion capable of abutting a selected surface of said trunk, an elongated rod embedded centrally and lengthwise in said platform and having a screw-threaded end portion projecting beyond an oriented area of said inward marginal edge portion and adapted to be screwed and retentively anchored in a selected area of said tree trunk, a V-shaped prop embodying a pair of outwardly diverging legs having free diverging ends which are pointed and adapted to be removably but supportively anchored in said trunk and having their converging ends joined by a U-shaped bight portion, and means joined to an inner end portion of said rod and constituting an adapter, said bight portion being pivotally joined to said adapter means.

2. The tree seat defined in and according to claim 1, and wherein said platform is saddle-shaped in top plan configuration and embodies an inward cantle portion and an outward pommel portion.

3. The tree seat defined in and according to claim 2, and wherein said platform is constructed from a pair of correspondingly contoured laminations designed and superimposed upon each other and securely bonded together to provide a unified seat, said rod being sandwiched and retained in grooves provided therefor in confronting surfaces of said laminations.

4. The tree seat defined in and according to claim 1, and wherein said adapter means comprises a lug rigidly joined to and depending from said rod and below the coacting underneath surface of said platform, said bight portion being pivotally linked to said lug.

5. The tree seat defined in and according to claim 1, and wherein said adapter means comprises a lug rigidly joined to and depending from said rod and below the coacting underneath surface of said platform, said bight portion being pivotally linked to said lug, said U-shaped bight portion having opposed limb portions rigidified by a stabilizing brace which is interposed between and united with said limb portions.

6. The tree seat defined in and according to claim 5, and wherein said rod has a median portion provided on diametrically opposite sides with angularly disposed rigid retaining fingers, said fingers being embedded in coordinating portions of the platform and serving to prevent axial turning or twisting of the rod relative to said platform whereby the rod and platform are securely unified for ready attachment to and subsequent detachment from said tree.

7. The tree seat defined in and according to claim 6, and wherein said rod is of a length commensurate with the length of said platform and is confined to a localized area midway between the respective lengthwise marginal edges of said platform.

8. A portable tree supported seat for use by a hunter comprising a platform, said platform being substantially saddle-shaped in top plan configuration and embodying an inward cantle portion and an outward pommel portion, said platform being constructed from a pair of correspondingly contoured laminations which are aligned with each other and securely fastened together, an elongated rigid rod embedded lengthwise in a centralized portion of said platform, a median portion of said rod being provided with diametrically opposite outstanding stabilizing fingers also embedded and which function to prevent rotation of the rod relative to the platform, said rod having an inner end portion screw-threaded to provide an attaching and anchoring shank, a V-shaped prop having downwardly diverging legs and upper converging end portions joined by a yoke, said yoke being rigidified by a complemental brace, and means connecting the rigidified yoke to said rod.

9. The tree seat defined in and according to claim 8, and wherein said means comprises a lug, said lug being integral with and depending from an underneath side of said rod and also depending below the bottom surface of the platform, said yoke being pivotally joined to said lug.

* * * * *